United States Patent
Najumudeen et al.

(10) Patent No.: US 12,026,048 B2
(45) Date of Patent: Jul. 2, 2024

(54) EARLY DETECTION AND AVOIDANCE OF MAINFRAME JOB ERRORS

(71) Applicant: Bank of America Corporation, Charlotte, NC (US)

(72) Inventors: Syed Najumudeen, Hyderabad (IN); Dalydas Karanath, Thrissur (IN); Radhika Vinaikrishnan Nair, Thane (IN)

(73) Assignee: Bank of America Corporation, Charlotte, NC (US)

( * ) Notice: Subject to any disclaimer, the term of this patent is extended or adjusted under 35 U.S.C. 154(b) by 50 days.

(21) Appl. No.: 17/932,908

(22) Filed: Sep. 16, 2022

(65) Prior Publication Data

US 2024/0095116 A1     Mar. 21, 2024

(51) Int. Cl.
*G06F 11/00* (2006.01)
*G06F 11/07* (2006.01)
*G06F 11/34* (2006.01)

(52) U.S. Cl.
CPC ........ *G06F 11/079* (2013.01); *G06F 11/3466* (2013.01)

(58) Field of Classification Search
CPC ........................... G06F 11/079; G06F 11/3466
USPC ........................................................ 714/1–57
See application file for complete search history.

(56) References Cited

U.S. PATENT DOCUMENTS

| | | | |
|---|---|---|---|
| 5,559,933 A | 9/1996 | Boswell | |
| 5,771,343 A | 6/1998 | Hafner et al. | |
| 6,064,821 A | 5/2000 | Shough et al. | |
| 6,952,726 B1 * | 10/2005 | White | G06F 3/1205 709/224 |
| 6,976,072 B2 | 12/2005 | Mathieson | |
| 7,107,283 B2 | 9/2006 | Seifi | |
| 7,634,559 B2 | 12/2009 | Brown | |
| 7,886,296 B2 | 2/2011 | Ly et al. | |
| 7,996,850 B2 | 8/2011 | Massmann et al. | |
| 8,024,369 B2 | 9/2011 | Pellegrini et al. | |
| 8,160,865 B1 * | 4/2012 | Coughlan | G06F 40/186 704/7 |
| 8,427,667 B2 | 4/2013 | Ly et al. | |
| 8,464,262 B2 | 6/2013 | Ly et al. | |
| 8,495,639 B2 | 7/2013 | Ly et al. | |
| 8,572,616 B2 | 10/2013 | Cai et al. | |
| 9,032,091 B2 | 5/2015 | Jobanputra et al. | |
| 9,405,582 B2 | 8/2016 | Fuller et al. | |
| 9,600,216 B2 | 3/2017 | Ly et al. | |
| 9,612,878 B2 | 4/2017 | Di Balsamo et al. | |
| 9,678,793 B2 | 6/2017 | Kumar et al. | |
| 9,740,522 B2 | 8/2017 | Schmidt et al. | |

(Continued)

*Primary Examiner* — Sarai E Butler (57) ABSTRACT

A system includes a memory and a processor configured to receive a request to process a primary mainframe job and extract information related to the primary mainframe job, wherein the extracted information includes one or more of data files, file attributes and database tables needed to process the primary mainframe job. The processor detects that one or more of the files, the file attributes and the database tables is unavailable, and in response, places the primary mainframe job on hold. The processor monitors availability of the one or more unavailable files, file attributes or database tables and in response to detecting that the one or more unavailable files, file attributes or database tables is available, processes the primary mainframe job.

18 Claims, 4 Drawing Sheets

(56) References Cited

U.S. PATENT DOCUMENTS

| | | |
|---|---|---|
| 9,811,574 B2 | 11/2017 | Verger-Del Bove et al. |
| 10,866,960 B2 | 12/2020 | Ocher et al. |
| 10,983,824 B2 | 4/2021 | Aggarwal |
| 11,269,911 B1 | 3/2022 | Desai et al. |
| 2007/0234101 A1* | 10/2007 | Koktan ............... G06F 11/1064 714/2 |
| 2008/0010642 A1* | 1/2008 | MacLellan ............ G06F 9/5038 718/102 |
| 2008/0133972 A1* | 6/2008 | Verbowski .............. G06F 21/57 714/37 |
| 2008/0250271 A1* | 10/2008 | Ozer ................... G06F 11/0793 712/E9.05 |
| 2008/0294937 A1* | 11/2008 | Ueda .................... G06F 9/4856 714/15 |
| 2009/0006905 A1* | 1/2009 | Luick ................... G06F 9/3858 714/E11.002 |
| 2009/0158099 A1* | 6/2009 | Cui ..................... G06F 11/0778 714/57 |
| 2010/0281307 A1 | 11/2010 | Ng |
| 2011/0154122 A1* | 6/2011 | Li ....................... G06F 11/3608 714/38.1 |
| 2012/0137309 A1 | 5/2012 | Makam et al. |
| 2014/0201747 A1 | 7/2014 | Pattnaik et al. |
| 2018/0336509 A1* | 11/2018 | Guttmann ........... G06F 21/6218 |
| 2020/0133817 A1 | 4/2020 | Schornack |
| 2023/0409419 A1* | 12/2023 | Gupta ................ G06F 11/0781 |

* cited by examiner

EARLY DETECTION AND AVOIDANCE OF MAINFRAME JOB ERRORS

TECHNICAL FIELD

The present disclosure relates generally to data processing, and more specifically to early detection and avoidance of mainframe job errors.

BACKGROUND

A mainframe computer, informally called a mainframe, is a computer used primarily by large organizations for critical applications like bulk data processing for tasks such as censuses, industry and consumer statistics, enterprise resource planning, and large-scale transaction processing. Several jobs may be run by a mainframe computer. The term "job" generally refers to a unit of work that a computer operator or a program such as a job scheduler gives to an operating system of the mainframe for processing. For example, a job may include running an application program such as a weekly payroll program. Mainframe jobs may be run in a batch mode where an operator or job scheduler gives the operating system a batch of jobs for processing. Several errors may occur in relation to a mainframe job that may cause the job to fail. These errors may include, but are not limited to, unavailability of required files, unavailability of required database tables, corrupted data files and/or tables, missing file attributes, and other failed mainframe jobs over which a primary job depends. It is important that errors related to mainframe jobs are timely resolved to avoid job failures. Further, when a job failure occurs, it is important that the error that caused the failure is timely fixed so that the job can be completed.

SUMMARY

The system and methods implemented by the system as disclosed in the present disclosure provide techniques for avoiding mainframe job failures. The disclosed system and methods provide several practical applications and technical advantages.

For example, the disclosed system and methods provide the practical application of intelligently predicting a mainframe job failure before it occurs and taking appropriate actions to avoid the failure from occurring. As discussed in embodiments of the present disclosure, before processing a mainframe job, a jobs manager checks metadata associated to the mainframe job and identifies the resources needed to process the mainframe job. The resources may include data files, file attributes, database tables, or a combination thereof. Upon detecting that one or more of the resources required to process the mainframe job are unavailable, jobs manager places the processing of the mainframe job on hold until the missing resources become available. After placing the mainframe job on hold, jobs manager monitors availability of the missing resources. Once the requisite resources become available, jobs manager initiates processing of the mainframe job. By holding processing of the mainframe job until all or most resources needed to process the mainframe job are available, jobs manager may avoid the mainframe job from failing. In certain embodiments, the mainframe job may be a primary mainframe job having one or more secondary mainframe jobs dependent therefrom which cannot be processed unless the primary mainframe job finishes its processing. Thus, by avoiding failure of the primary mainframe job, jobs manager also avoids failure of the one or more secondary mainframe jobs which depend on the processing of primary mainframe job.

By avoiding mainframe job failures from occurring, the system and methods described in this disclosure provide the technical advantage of improving processing efficiently of mainframe computers in charge of processing the mainframe jobs. For example, avoiding mainframe job failures from occurring may save the mainframe computers additional processing related to resolving errors that caused the failures to occur and re-processing the mainframe jobs after the errors have been resolved. Thus, the system and methods described in this disclosure save processing resources and memory resources which would otherwise be used in processing failed mainframe jobs. Avoiding mainframe jobs from failing provides the additional technical advantage of avoiding delays associated with processing failed mainframe jobs. This improves the processing speed of processors in charge of processing the mainframe jobs. Thus, the system and methods described in this disclosure generally improve the technology related to mainframe computers.

The disclosed system and methods provide the additional practical application of intelligently healing/resolving any failed mainframe jobs. As described in accordance with embodiments of the present disclosure, jobs manager identifies a nature of an error that caused a mainframe job to fail, determines one or more corrective actions that can be taken to resolve the error, applies the one or more corrective actions to the failed mainframe job and processes the mainframe job after applying the one or more corrective actions. Metadata relating to the failed mainframe job includes an error description of the error that caused the mainframe job to fail. The error description identifies the error that caused a mainframe job to fail using an error code. The metadata stores a list of error codes and a set of one or more corrective actions corresponding to each error code in the list. Jobs manager searches this list based on the error code of the identified error (e.g., identified based on error description) that caused the mainframe job to fail. When the error code extracted from the error description of the failed mainframe job matches with an error code from the list, jobs manager reads from the list the set of corrective actions corresponding to the matched error code. Jobs manager applies the determined set of corrective actions and re-processes the mainframe job after applying the corrective actions.

By timely resolving errors associated with failed mainframe jobs, the system and methods described in this disclosure provide the technical advantage of improving processing efficiently of mainframe computers in charge of processing the mainframe jobs. For example, timely healing and re-processing failed mainframe jobs reduces/avoids delays in processing a jobs stream of a batch of jobs of which the failed mainframe job is a part. Additionally, timely healing and re-processing failed mainframe jobs reduces/avoids delays and potential failure in processing one or more secondary jobs that depend on the failed mainframe job for their processing. Avoiding delays in processing mainframe jobs improves processing speed related to processors in charge of processing the mainframe jobs. Thus, the system and methods described in this disclosure generally improve the technology related to mainframe computers.

BRIEF DESCRIPTION OF THE DRAWINGS

For a more complete understanding of this disclosure, reference is now made to the following brief description.

DETAILED DESCRIPTION

System Overview

Figure 1:
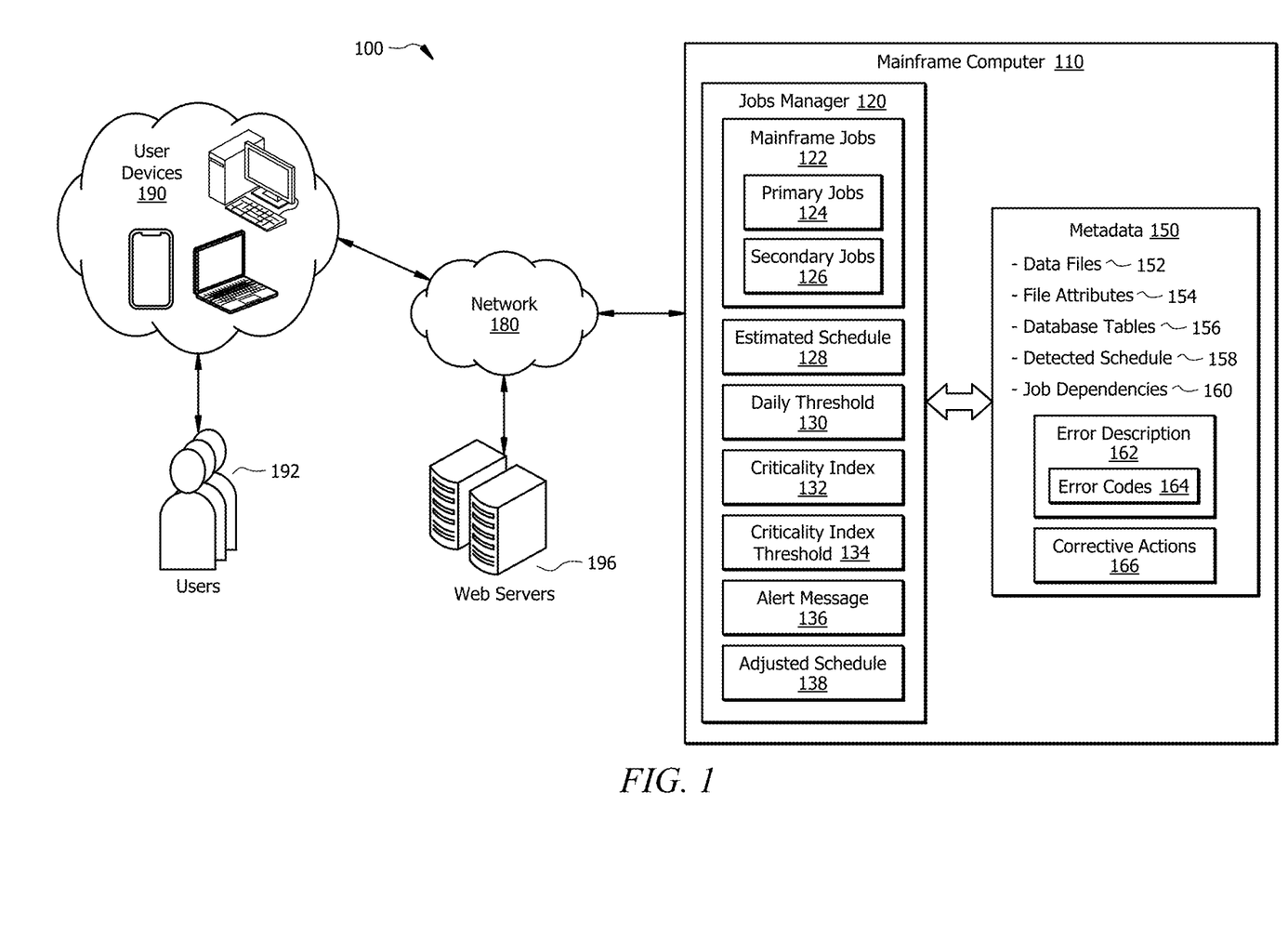
FIG. 1 is a schematic diagram of an example data processing system, in accordance with one or more embodiments of the present disclosure.

FIG. 1 is a schematic diagram of an example data processing system 100, in accordance with one or more embodiments of the present disclosure.

As shown in FIG. 1, data processing system 100 may include a mainframe computer 110, one or more web servers 196 and one or more user devices 190, each connected to a network 180. The network 180, in general, may be a wide area network (WAN), a personal area network (PAN), a cellular network, or any other technology that allows devices to communicate electronically with other devices. In one or more embodiments, the network 180 may be the Internet. Each user device 190 may be operated by one or more users 192. Each user device 190 may be a computing device that can be operated by a user 192 and communicate with other devices connected to the network 180.

In one or more embodiments, each of the mainframe computer 110, web servers 196 and user devices 190 may be implemented by a computing device running one or more software applications. For example, one or more of the mainframe computer 110, web servers 196 and user devices 190 may be representative of a computing system hosting software applications that may be installed and run locally or may be used to access software applications running on a server (not shown). The computing system may include mobile computing systems including smart phones, tablet computers, laptop computers, or any other mobile computing devices or systems capable of running software applications and communicating with other devices. The computing system may also include non-mobile computing devices such as desktop computers or other non-mobile computing devices capable of running software applications and communicating with other devices. In certain embodiments, one or more of the mainframe computer 110, web servers 196 and user devices 190 may be representative of a server running one or more software applications to implement respective functionality as described below. In certain embodiments, one or more of the mainframe computer 110, web servers 196 and user devices 190 may run a thin client software application where the processing is directed by the thin client but largely performed by a central entity such as a server (not shown).

In one embodiment, the mainframe computer 110 may be a standalone computing device (e.g., desktop computer, laptop computer, mobile computing device etc.) directly connected to or including a display device (e.g., a desktop monitor, laptop screen, smartphone screen etc.) and a user interface device (e.g., keyboard, computer mouse, touchpad etc.) allowing a user 192 to interact with the computing device.

Mainframe computer 110 may include a jobs manager 120 and may store metadata 150. Jobs manager 120 may be configured to process mainframe jobs 122. A mainframe job 122 may be a primary job 124, a secondary job 126 or both. The term "primary job 124" or "primary mainframe job 124" in this disclosure refers to a mainframe job 122 upon which one or more other mainframe jobs 122 (e.g., secondary jobs 126) depend for their processing. The term "secondary job 126" or "secondary mainframe job 126" in this disclosure refers to a mainframe job 122 which depends on another primary mainframe job 124 for its processing. Multiple secondary jobs 126 may depend on a primary job 124. A single secondary job 126 may depend on multiple primary jobs 124. A secondary job 126 usually cannot be processed before one or more primary jobs 124 upon which the secondary job 126 depends finish their processing. For example, a secondary job 126 may need data generated by a primary job 124. In some embodiments, a mainframe job 122 may be a primary job 124 as well as a secondary job 126.

Mainframe computer 110 may store metadata 150 relating to mainframe jobs 122. Metadata 150 relating to a mainframe job 122 may include, but is not limited to, information regarding data files 152 needed to process the mainframe job 122, information regarding file attributes 154 relating to one or more data files 152 needed to process the mainframe job 122, information regarding database tables 156 needed to process the mainframe job 122, an expected schedule 158 relating to the mainframe job 122 and job dependencies 160 relating to the mainframe job. Metadata 150 may further include error descriptions 162 of a plurality of known errors associated with mainframe jobs 122 and corrective actions 166 corresponding to the error description 162. Each of these metadata 150 is described in further detail below.

Embodiments of the present disclosure describe techniques to anticipate or predict errors associated with a mainframe job 122 and take one or more actions to avoid failure of the mainframe job 122.

When the jobs manager 120 detects that a mainframe job 122 is scheduled for processing or about to be scheduled for processing, jobs manager 120 checks the metadata 150 relating to the mainframe job 122 and determines whether all resources needed to process the mainframe job 122 are available. Resources needed to process the mainframe job 122 may include but are not limited to, one or more data files 152, one or more file attributes 154 and/or one or more database tables 156. In one or more embodiments, as part of processing the mainframe job 122 an application program may need to read data from a data file 152 and/or write data into a data file 152. Thus, unless the data file 152 is available to be read from or written into, the mainframe job 122 cannot be processed. Similarly, in one or more embodiments, as part of processing the mainframe job 122, the application program may need to read data from a database table 156 and/or write data into a database table 156. Thus, unless the database table 156 is available to be read from or written into, the mainframe job 122 cannot be processed. In some cases, a data file 152 and/or a database table 156 needed to process the mainframe job 122 may be unavailable when the mainframe job 122 is submitted for processing (e.g., to a mainframe job scheduler). For example, the mainframe job 122 may be a secondary mainframe job 126 that depends on another primary mainframe job 124. The data file 152 needed to process the secondary mainframe job 126 may be generated as a result of processing the primary mainframe job 124. Thus, the required data file 152 may not be available until the primary mainframe job 124 has finished its processing and generated the data file 152. Similarly, as part of processing the primary mainframe job 124, the application program may be configured to write into the database table 156. The secondary mainframe job 126 may be configured to read from or write into the database table 156 after the primary mainframe job 124 has updated the database table 156. Thus, the database table 156 is unusable by the secondary mainframe job 126 until the primary mainframe job 124 has completed its processing and finished updating the database table 156.

One or more file attributes 154 may be defined in relation to a data file 152 to ensure that the data file 152 has sufficient data integrity for use by the mainframe job 122. The mainframe job 122 usually cannot be processed unless the required data files 152 have all or most of the respective defined file attributes 154. A data file 152 needed to process the mainframe job 122 may be required to have certain file attributes 154 including, but are not limited to, a pre-defined file size, a pre-defined file format (e.g., fixed format, variable format, flat file, index-based file etc.), pre-defined headers, pre-defined trailers and a pre-defined date or date range.

Before processing a mainframe job 122, the jobs manager 120 may be configured to check the metadata 150 related to the mainframe job 122 and identify the resources (e.g., data files 152, file attributes 154 and database tables 156) needed to process the mainframe job 122. Once the required resources are identified from the metadata 150 associated with the mainframe job 122, jobs manager 120 may check whether the identified resources (e.g., data files 152, database tables 156, file attributes 154) are available. For example, jobs manager 120 may determine whether one or more required data files 152 and/or one or more required database tables 156 to be used during the processing of the mainframe job 122 are available. Additionally, jobs manager 120 may check for the integrity of the required data files 152 by determining whether one or more of the required data files 152 include or are associated with the identified file attributes 154. For example, jobs manager 120 may check whether a data file 152 includes a pre-defined header and/or a pre-defined trailer.

Upon detecting that one or more of the required resources required to process the mainframe job 122 are unavailable, jobs manager 120 may place the processing of the mainframe job 122 on hold until the missing resources become available. After placing the mainframe job 122 on hold, jobs manager 120 may be configured to monitor availability of the missing resources. Once the requisite resources become available, jobs manager 120 may initiate processing of the mainframe job 122. In one embodiment, jobs manager 120 may initiate processing of the mainframe job 122 by loading the mainframe job 122 in a mainframe job scheduler. By holding processing of the mainframe job 122 until all or most resources needed to process the mainframe job 122 are available, jobs manager 120 may avoid the mainframe job 122 from failing. In one embodiment, the mainframe job 122 may be a primary mainframe job 124 having one or more secondary mainframe jobs 126 dependent therefrom which cannot be processed unless the primary mainframe job 124 finishes its processing. Thus, by avoiding failure of the primary mainframe job 124, jobs manager 120 may also avoid failure of the one or more secondary mainframe jobs 126 which depend on the processing of primary mainframe job 124.

In some embodiments, the mainframe computer 110 may store the metadata 150 in relation to mainframe jobs 122 in a format that is not interpretable or not readily interpretable by the jobs manager 120. For example, metadata 150 may be maintained in specialized mainframe languages that the jobs manager 120 cannot read as is. Jobs manager 120 may be configured to convert at least a portion of the metadata 150 relating to a mainframe job 122 (e.g., mainframe job 122 scheduled/requested for processing) into pseudo code. The pseudo code may include a plain language description of the resources (e.g., data files 152, file attributes 154, database tables 156 etc.) needed to process the mainframe job 122 and steps involved in processing the mainframe job 122 that are interpretable by the jobs manager 120. The jobs manager 120 may read the pseudo code to determine the resources and steps involved in processing the mainframe job 122 and process the mainframe job 122 accordingly, for example, as described in accordance with embodiments of the present disclosure. In some cases, metadata 150 may include data (e.g., comments) that the jobs manager 120 may not need to process a mainframe job 122. In such cases, jobs manager 120 may be configured to extract a portion of the metadata 150 that is needed to process a mainframe job 122 while leaving out information (e.g., comments data) from the metadata 150 that is not needed to process the mainframe job. In other words, jobs manager 120 does not convert into pseudo code information that is not needed to process the mainframe job 122. In some embodiments, jobs manager 120 may use a generator and discriminator model with token replacement to convert the metadata 150 or portion thereof into pseudo code.

Jobs manager 120 may be configured to estimate a completion time of a mainframe job 122 based on an expected schedule 158 of the mainframe job 122 and any delays incurred in processing the mainframe job 122. Metadata 150 relating to mainframe job 122 includes an expected schedule 158 related to the mainframe job 122. The expected schedule 158 related to the mainframe job 122 may include an expected commencement time at which processing of the mainframe job 122 is expected to begin and an expected completion time by which the processing is expected to be completed. In certain embodiments, metadata 150 related to the mainframe job 122 may also include job dependencies 160 and expected schedules 158 for one or more primary jobs 124 on which the mainframe job 122 depends, as well as for one or more secondary jobs 126 that depend on the mainframe job 122. For each mainframe job 122, job dependencies 160 may include information relating to one or more primary jobs 124 the mainframe job 122 depends from and one or more secondary jobs 126 that depend from the mainframe job 122.

In some embodiments, mainframe jobs 122 may not adhere to their respective expected schedules 158 as a result of several delays associated with processing mainframe jobs in a job stream. The term "job stream" may refer to a series of mainframe jobs 122 that are processed in a batch of mainframe jobs. For example, delays associated with processing a primary job 124 may result in delays in processing secondary jobs 126 which depend therefrom downstream from the primary job 124. Jobs manager 120 may be configured to determine job dependencies 160 in a job stream and generate an estimated schedule 128 for one or more mainframe jobs 122 in the job stream based on the respective expected schedules 158 relating to each mainframe job 122 in the job stream and delays associated with processing upstream primary jobs 124. The estimated schedule 128 determined for a mainframe job 122 may include an estimated commencement time and/or an estimated completion time of the mainframe job 122. For example, jobs manager 120 may determine an actual completion time of a primary mainframe job 124 which may be delayed from the expected completion time of the primary job 124, for example, as a result of holding processing of the primary job 124 due to unavailability of resources. The actual completion time may refer to the actual time at which processing of the primary mainframe job 124 was completed. The jobs manager 120 may determine an amount of delay in completing the primary job 124 by comparing the actual completion time and the expected completion time of the primary job 124. For example, when the expected completion time is 10 milli seconds (ms) and the actual completion time is 20 ms, the delay can be determined as 10 ms. Once the amount of delay associated with the primary job 124 is determined, jobs manager 120 may determine estimated delayed schedules (e.g., delayed commencement and/or completion times) of one or more secondary jobs 126 which depend from the primary job 124. For example, jobs manager 120 may add the determined delay in the primary job 124 to the expected commencement time of a secondary job 126 to determine an estimated commencement time of the secondary job 126. Similarly, jobs manager 120 may add the determined delay in the primary job 124 to the expected completion time of the secondary job 126 to determine an estimated competition time of the secondary job 126. Jobs manager 120 may perform the above steps in relation to each mainframe job 122 in a jobs stream and estimate the schedule of the mainframe job accordingly. For example, the estimated schedule 128 of a secondary job 126 may be further updated based on delays incurred in another primary job 124 the secondary job 126 depends from and/or as a result of delays in processing the secondary mainframe job 126, for example, due to delayed availability of resources.

In one or more embodiments, a delay associated with a mainframe job 122 may be because of the mainframe job 122 failing and a time taken to correct the error. Jobs manager 120 may determine/update an estimated schedule 128 of a secondary job 126 based on any failed primary jobs 124 upstream from the secondary job 126. For example, when an upstream primary job 124 fails, it affects the schedule related to secondary jobs 126 that depend therefrom. Jobs manager 120 may estimate schedules for each of the secondary jobs 126 based on the delay associated with the failed primary job 124.

Jobs manager 120 may be configured to determine a criticality index 132 relating to mainframe jobs 122. Criticality index 132 associated with a primary job 124 may be indicative of how critical the primary job 124 is for processing in a mainframe job stream. Specifically, criticality index 132 associated with the primary job 124 may be indicative of how critical the primary job 124 is for processing one or more downstream secondary jobs 126 that may depend on the primary job 124. In one embodiment, criticality index 132 may be an integer. For example, criticality index 132 may range from 1-10, where 1 represents the lowest criticality to the jobs stream and 10 represents the highest criticality to the jobs stream.

In one embodiment, jobs manager 120 assigns a criticality index 132 to a primary job 124 based on a number of secondary jobs 126 that depend on the primary job 124. For example, jobs manager 120 assigns a higher criticality index 132 to a primary job 124 when more secondary jobs 126 depend on the primary job 124, as an impact of the primary job 124 is higher on the jobs stream when more secondary jobs 126 depend on the primary job 124. In this context, to determine a criticality index 132 for a primary job 124, jobs manager 120 may determine a number of secondary jobs 126 that depend on the primary job 124 (e.g., based on job dependencies 160) and assign a criticality index 132 to the primary job 124 based on the number of dependent secondary jobs 126.

In one embodiment, jobs manager 120 assigns a criticality index 132 to a primary job 124 based on a delay associated with one or more secondary jobs 126 that depend on the primary job 124 for their processing. In other words, criticality index 132 of the primary job 124 is assigned based on an amount of delay the primary job 124 causes to one or more secondary jobs 126. For example, jobs manager 120 assigns a higher criticality index 132 to a primary job 124 when delay associated with one or more secondary jobs 126 is higher, as a higher delay generally translates to a higher impact on the jobs stream. Jobs manager 120 may assign the criticality index 132 to the primary job 124 based on delay associated with a single secondary job 126 or based on a combined delay associated with multiple secondary jobs 126 that depend on the primary job 124. In this context, to determine a criticality index 132 for a primary job 124, jobs manager 120 may first determine (e.g., based on job dependencies 160) that a secondary job 126 depends on the primary job 124. Jobs manager 120 may then determine an estimated schedule 128 of the secondary job 126 based on the estimated or actual completion time of the primary job 124 and an expected schedule 158 associated with the secondary job 126. For example, by comparing an expected completion time associated with the primary job 124 (extracted from an expected schedule 158 of the primary job 124) and the actual completion time of the primary job 124, jobs manager 120 may determine a delay in completing processing of the primary job 124. Jobs manager 120 may then determine an estimated completion time for the secondary job 126, at least in part, based on the expected completion time of the secondary job 126 and the determined delay in completing the primary job 124. As described above, jobs manager 120 may add the determined delay in the primary job 124 to the expected completion time of the secondary job 126. Jobs manager 120 may assign a criticality index 132 to the primary job 124 based on the amount of delay associated with completion of the secondary job 126. As described above, a higher criticality index 132 may be assigned to the primary job 124 when it causes a higher amount of delay in the secondary job 126.

In one or more embodiments, the secondary job 126 may indirectly depend on the primary job 124 with one or more other intervening secondary jobs 126 therebetween. For example, a first secondary job may depend on the primary job 124 and a second secondary job may depend on the first secondary job. A delay in processing the primary job 124 may cause a first amount of delay in completing the first secondary job. The first amount of delay may cause the first secondary job to fail, for example, due to the first amount of delay exceeding a threshold delay preset for the first secondary job. Fixing this error in the failed first secondary job and then processing the first secondary job may introduce further delays in addition to the delay caused by a delay in processing the primary job 124. This may further delay the second secondary job that depends on the first secondary job for its processing. Thus, in this case, a delay in the primary job 124 may cause a much longer delay in completing the second secondary job than the delay in processing the primary job 124 alone. Jobs manager 120 may determine an estimated completion time of the second secondary job based on the expected completion time of the second secondary job and the delays directly caused by the primary job 124 and the additional delay caused by the first secondary job. Jobs manager 120 may determine a delay in completing the second secondary job by comparing the estimated completion time and the expected completion time of the second secondary job. Jobs manager 120 may then assign a criticality index 132 to the primary job 124 based on the determined delay in completing the second secondary job. It may be noted that the criticality index 132 assigned to the primary job 124 based on the delay in the second secondary job may be higher than the criticality index 132 assigned to the primary job 124 based on the delay in the first secondary job, as the delay in the second secondary job is higher. In certain embodiments, jobs manager 120 may be configured to assign the criticality index 132 to the primary job 124 based on the highest amount of delay it causes to a secondary job downstream from the primary job 124.

In certain embodiments, jobs manager 120 may be configured to determine a combined delay the primary job 124 causes to all secondary jobs 126 that depend on the primary job 124. Jobs manager 120 may assign the criticality index 132 to the primary job 124 based on the combined delay.

In certain embodiments, jobs manager 120 may be configured to assign the criticality index 132 to the primary job 124 based on the delay associated with completing the primary job 124, where a higher criticality index 132 is assigned for a higher delay in completing the primary job 124.

Jobs manager 120 may be configured to update criticality indices 132 of mainframe jobs 122 at preconfigured time intervals.

Jobs manager 120 may be configured to generate alert messages 136 when mainframe jobs 122 deviate from their expected schedules 158. Jobs manager 120 may be configured to generate alert messages 136 based on delays in processing a mainframe job 122. Jobs manager 120 may be configured to compare an expected schedule 158 associated with a mainframe job 122 and an estimated schedule 128 determined for the mainframe job 122. Jobs manager 120 may generate an alert message 136 in relation to the mainframe job 122 upon detecting a delay associated with processing the mainframe job 122 based on the comparison. In one embodiment, jobs manager 120 may be configured to generate the alert message 136 in relation to the mainframe job 122 when the determined delay associated with processing the mainframe job 122 equals or exceeds a preconfigured delay threshold 130. Jobs manager 120 may be configured to transmit the alert message 136 to an administrative computing node of a mainframe administrator who may take appropriate action in response to receiving the alert message 136. The alert message 136 generated for a mainframe job 122 may include information relating to the mainframe job 122 such as an identity of the mainframe job, expected schedule 158, estimated schedule 158 and reasons for delays.

Jobs manager 120 may be configured to generate alert messages 136 when critical mainframe jobs are delayed beyond a delay threshold 130. When jobs manager 120 detects that a delay associated with a mainframe job 122 equals or exceeds the delay threshold 130, jobs manager 120 checks whether the criticality index 132 associated with the mainframe job 122 equals or exceeds a criticality index threshold 134. Jobs manager 120 may generate the alert message 136 in relation to the mainframe job 122 when the criticality index 132 associated with the mainframe job 122 equals or exceeds the criticality index threshold 134. Jobs manager 120 may not generate the alert message 136 when the criticality index 132 associated with the mainframe job 122 is below the criticality index threshold 134. In other words, jobs manager 120 does not generate alert messages 136 for non-critical mainframe jobs even when the delay associated with the non-critical jobs equals or exceeds the delay threshold 130. As described above, jobs manager 120 may send the generated alert message 136 to an administrative computing node.

When processing of a mainframe job 122 has finished and the estimated schedule 128 (e.g., determined as described above) of the mainframe job 122 deviates from the expected schedule 158 of the mainframe job 122, jobs manager 120 may be configured to adjust the expected schedule 158 associated with the mainframe job 122 to generate an adjusted schedule 138 that accounts for any deviations from the expected schedule 158. The adjusted schedule 138 is then used as the expected schedule 158 of the mainframe job 122 when processing subsequent instances of the mainframe job 122. For example, when the estimated schedule 128 of a secondary job 126 is delayed as compared to the expected schedule 158 of the secondary job 126 (e.g., as a result of a delay in a primary job 124, unavailable resources etc.), jobs manager 120 may adjust the expected schedule 158 to account for the delay as per the estimated schedule 128. For example, jobs manager 120 may add the determined delay to the expected commencement time and/or the expected completion time of the secondary mainframe job 126. By adjusting the expected schedule 158 of a mainframe job 122, jobs manager 120 avoids any errors while processing subsequent requests to process the mainframe job 122.

Jobs manager 120 may be configured to intelligently heal/correct failures related to mainframe jobs 122. A mainframe job 122 may fail due to several reasons or errors including, but not limited to, unavailability of required data files 152, missing file attributes 154, unavailability of required database tables 156, and inaccessible or erroneous data. Jobs manager 120 may be configured to identify a nature of an error that caused a mainframe job 122 to fail, determine one or more corrective actions that can be taken to resolve the error, apply the one or more corrective actions to the failed mainframe job and process the mainframe job 122 after applying the one or more corrective actions. The metadata 150 relating to a failed mainframe job 122 may include an error description 162 of the error that caused the mainframe job 122 to fail. In one example, the error may be that a required data file 152 was unavailable and the corresponding error description 162 may identify this error and may further include an identity of the unavailable data file 152. In another example, the error may be that one or more file attributes 154 in relation to a data file 152 were missing and the corresponding error description 162 may identify this error and further include an identities of the data file 152 and the missing file attributes 154. In another example, the error may be that a required database table 156 was unavailable and the corresponding error description may identify this error and further include an identity of the unavailable database table 156. The error description 162 may identify an error that caused a mainframe job to fail using an error code 164. An error code 164 is unique and is generally associated with a particular known error in relation to mainframe jobs 122 and a corresponding pre-defined error definition that defines the error. Jobs manager 120 may be configured to identify the error that caused a mainframe job 122 to fail based on the error description 162 (e.g., error code 164) associated with the failed mainframe job 122.

Metadata 150 associated with the mainframe job 122 may include a set of corrective actions 166 that may be performed to resolve an error that caused the mainframe job 122 to fail. For example, metadata 150 may store a list of error codes 164 and a set of one or more corrective actions 166 corresponding to each error code 164 in the list. Jobs manager 120 may be configured to search this list based on the error code 164 of the identified error (e.g., identified based on error description 162) that caused the mainframe job 122 to fail. When the error code 164 extracted from the error description 162 of the failed mainframe job 122 matches with an error code from the list, jobs manager 120 may read from the list the set of corrective actions 166 corresponding to the matched error code 164. Jobs manager 120 may apply the determined set of corrective actions 166 and re-process the mainframe job 122 after applying the corrective actions 166. In one example, when the mainframe job 122 failed as a result of an unavailable data file 152, the corresponding set of corrective actions 166 may include creating an empty file before re-processing the mainframe job 122. In another example, when the mainframe job 122 failed as a result of an invalid data field, the corresponding set of corrective actions 166 may include checking metadata 150 to determine the correct data field, correcting the data field accordingly and re-processing the mainframe job 122. In another example, when the mainframe job 122 failed as a result of unavailability of a database table 156, the corresponding set of corrective actions 166 may include checking whether the database table 156 is available, and re-processing the mainframe job 122 after confirming that the database table 156 is available.

In some embodiments, the mainframe computer 110 may store the metadata 150 in relation to failed mainframe jobs 122 in a format that is not interpretable or not readily interpretable by the jobs manager 120. For example, metadata 150 may be maintained in specialized mainframe languages that the jobs manager 120 cannot read as is. Jobs manager 120 may be configured to convert at least a portion of the metadata 150 relating to a failed mainframe job 122 (e.g., error description 162, error codes 164, corrective actions 166 etc.) into pseudo code. The pseudo code may include a plain language description of the error description 162, error codes 164, and corrective actions 166 that is interpretable by the jobs manager 120. The jobs manager 120 may read the pseudo code to determine the error description 162, error codes 164, and corrective actions 166 and process the mainframe job 122 accordingly, for example, as described in accordance with embodiments of the present disclosure.

In one or more embodiments, when error code 164 extracted from the error description 162 of the failed mainframe job 122 does not match with a corresponding error code 164 in the list stored at the mainframe computer 110, jobs manager 120 may be configured to search one or more servers (e.g., web servers 196 connected to the network 180) for a similar error and corresponding set of corrective actions that may resolve the error. For example, jobs manager 120 may extract one or more keywords from the error description 162 and search the internet based on the one or more keywords. In one embodiment, the one or more keywords may be extracted from an error definition associated with the error code 164 associated with the error that caused the mainframe job to fail. Based on the keyword search, jobs manager 120 may find on a web server 196 an error description that is similar to the error description 162 associated with the failed mainframe job 122 and a corresponding set of corrective actions. For example, the error description found on the web server 196 may include one or more of the keywords used for the keyword search. Jobs manager 120 may be configured to download the set of corrective actions from the web server 196, apply the set of corrective actions, and re-process the mainframe job 122 after applying the corrective actions. Hence, even when an exact error code match is not found in the mainframe computer 110, the keyword search may allow identifying a set of corrective actions that correspond to a similar error and may help resolve the error associated with the mainframe job 122.

Jobs manager 120 may be configured to apply corrective actions 166 in relation to non-critical or less critical failed mainframe job 122. When jobs manager 120 identifies a set of corrective actions (as described above) in relation to an error that caused a mainframe job 122 to fail, jobs manager 120 may obtain the criticality index 132 related to the failed mainframe job 122. When the criticality index 132 is below a criticality index threshold 134, indicating that the mainframe job 122 is not critical or less critical, jobs manager 120 may proceed to apply the determined corrective actions 166 and re-process the failed mainframe job 122 after applying the corrective actions 166. On the other hand, when the criticality index 132 equals or exceeds the criticality index threshold 134, jobs manager 120 does not apply the corrective actions 166. Instead, in one embodiment, when the criticality index 132 equals or exceeds the criticality index threshold 134, jobs manager 120 generates an alert message 136 that includes the error description 162 relating to the failed mainframe job 122 and the determined set of corrective actions 166. Jobs manager 120 may be configured to transmit the alert message 136 to an administrative computing node of a mainframe administrator who may take appropriate action in response to receiving the alert message 136.

Figure 2:
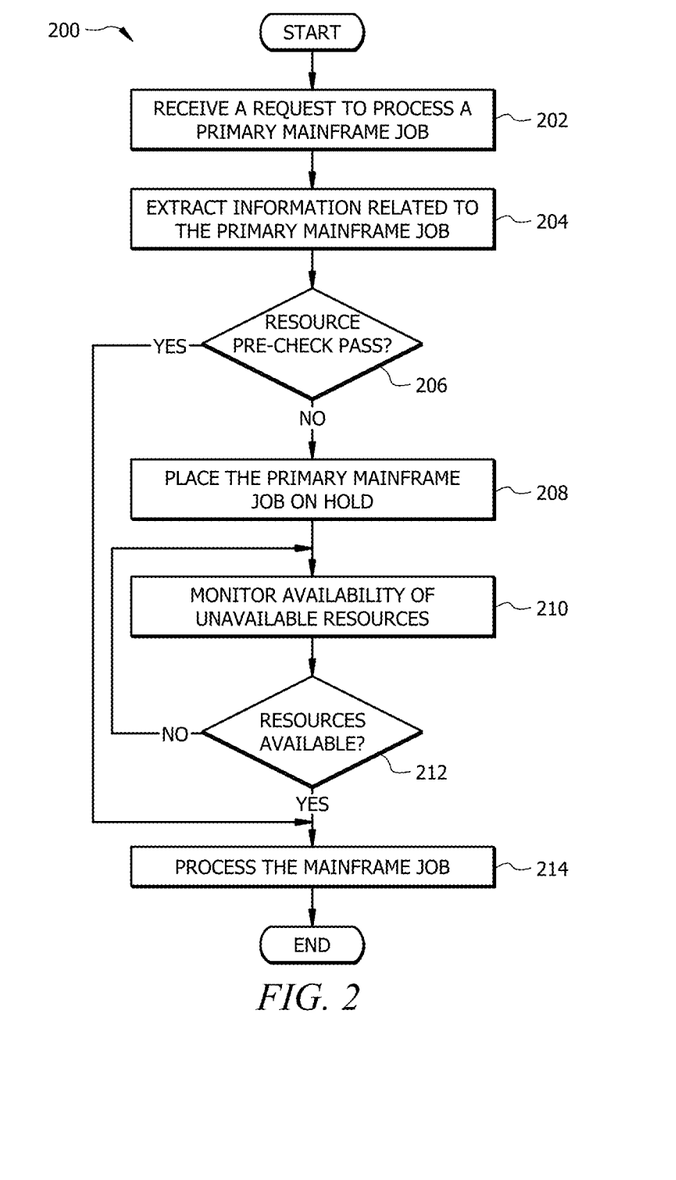
FIG. 2 is a flowchart of an example method for prediction and avoidance of mainframe job errors, in accordance with one or more embodiments of the present disclosure.

FIG. 2 is a flowchart of an example method 200 for prediction and avoidance of mainframe job errors, in accordance with one or more embodiments of the present disclosure. Method 200 may be performed by the jobs manager 120 as shown in FIG. 1 and described above.

At operation 202, jobs manager 120 receives a request to process a mainframe job 122 (e.g., primary mainframe job 124 or secondary mainframe job 126).

As described above, mainframe computer 110 may include a jobs manager 120 and may store metadata 150. Jobs manager 120 may be configured to process mainframe jobs 122. A mainframe job 122 may be a primary job 124, a secondary job 126 or both. The term "primary job 124" or "primary mainframe job 124" in this disclosure refers to a mainframe job 122 upon which one or more other mainframe jobs 122 (e.g., secondary jobs 126) depend for their processing. The term "secondary job 126" or "secondary mainframe job 126" in this disclosure refers to a mainframe job 122 which depends on another primary mainframe job 124 for its processing. Multiple secondary jobs 126 may depend on a primary job 124. A single secondary job 126 may depend on multiple primary jobs 124. A secondary job 126 usually cannot be processed before one or more primary jobs 124 upon which the secondary job 126 depends finish their processing. For example, a secondary job 126 may need data generated by a primary job 124. In some embodiments, a mainframe job 122 may be a primary job 124 as well as a secondary job 126.

At operation 204, jobs manager 120 extracts information related to the mainframe job 122 from metadata associated to the mainframe job 122, wherein the extracted information includes one or more of data files 152, file attributes 154 and database tables 156 needed to process the mainframe job 122.

As described above, mainframe computer 110 may store metadata 150 relating to mainframe jobs 122. Metadata 150 relating to a mainframe job 122 may include, but is not limited to, information regarding data files 152 needed to process the mainframe job 122, information regarding file attributes 154 relating to one or more data files 152 needed to process the mainframe job 122, information regarding database tables 156 needed to process the mainframe job 122, an expected schedule 158 relating to the mainframe job 122 and job dependencies 160 relating to the mainframe job. Metadata 150 may further include error descriptions 162 of a plurality of known errors associated with mainframe jobs 122 and corrective actions 166 corresponding to the error description 162.

In some embodiments, the mainframe computer 110 may store the metadata 150 in relation to mainframe jobs 122 in a format that is not interpretable or not readily interpretable by the jobs manager 120. For example, metadata 150 may be maintained in specialized mainframe languages that the jobs manager 120 cannot read as is. Jobs manager 120 may be configured to convert at least a portion of the metadata 150 relating to a mainframe job 122 (e.g., mainframe job 122 scheduled/requested for processing) into pseudo code. The pseudo code may include a plain language description of the resources (e.g., data files 152, file attributes 154, database tables 156 etc.) needed to process the mainframe job 122 and steps involved in processing the mainframe job 122 that are interpretable by the jobs manager 120. The jobs manager 120 may read the pseudo code to determine the resources and steps involved in processing the mainframe job 122 and process the mainframe job 122 accordingly, for example, as described in accordance with embodiments of the present disclosure. In some cases, metadata 150 may include data (e.g., comments) that the jobs manager 120 may not need to process a mainframe job 122. In such cases, jobs manager 120 may be configured to extract a portion of the metadata 150 that is needed to process a mainframe job 122 while leaving out information (e.g., comments data) from the metadata 150 that is not needed to process the mainframe job. In other words, jobs manager 120 does not convert into pseudo code information that is not needed to process the mainframe job 122. In some embodiments, jobs manager 120 may use a generator and discriminator model with token replacement to convert the metadata 150 or portion thereof into pseudo code.

At operation 206, jobs manager 120 performs a pre-check to determine whether all resources needed to process the mainframe job 122 are available and/or accessible. Availability of a resource may include the resource being available and/or accessible (e.g., in the defined format). For example, jobs manager 120 performs a pre-check based on the metadata 150 associated with the mainframe job 122 to determine whether all resources needed to process the mainframe job 122 are available and/or accessible. For example, jobs manager 120 checks whether a data file 152 or a database table 156 are in accordance with one or more parameters as defined in the metadata 150. When the data file 152 and/or database table 156 are not in the defined format, the respective data file 152 or database table 156 is determined to be unavailable.

As described above, when the jobs manager 120 detects that a mainframe job 122 is scheduled for processing or about to be scheduled for processing, jobs manager 120 checks the metadata 150 relating to the mainframe job 122 and determines whether all resources needed to process the mainframe job 122 are available. Resources needed to process the mainframe job 122 may include but are not limited to, one or more data files 152, one or more file attributes 154 and/or one or more database tables 156. In one or more embodiments, as part of processing the mainframe job 122 an application program may need to read data from a data file 152 and/or write data into a data file 152. Thus, unless the data file 152 is available to be read from or written into, the mainframe job 122 cannot be processed. Similarly, in one or more embodiments, as part of processing the mainframe job 122, the application program may need to read data from a database table 156 and/or write data into a database table 156. Thus, unless the database table 156 is available to be read from or written into, the mainframe job 122 cannot be processed. In some cases, a data file 152 and/or a database table 156 needed to process the mainframe job 122 may be unavailable when the mainframe job 122 is submitted for processing (e.g., to a mainframe job scheduler). For example, the mainframe job 122 may be a secondary mainframe job 126 that depends on another primary mainframe job 124. The data file 152 needed to process the secondary mainframe job 126 may be generated as a result of processing the primary mainframe job 124. Thus, the required data file 152 may not be available until the primary mainframe job 124 has finished its processing and generated the data file 152. Similarly, as part of processing the primary mainframe job 124, the application program may be configured to write into the database table 156. The secondary mainframe job 126 may be configured to read from or write into the database table 156 after the primary mainframe job 124 has updated the database table 156. Thus, the database table 156 is unusable by the secondary mainframe job 126 until the primary mainframe job 124 has completed its processing and finished updating the database table 156.

One or more file attributes 154 may be defined in relation to a data file 152 to ensure that the data file 152 has sufficient data integrity for use by the mainframe job 122. The mainframe job 122 usually cannot be processed unless the required data files 152 have all or most of the respective defined file attributes 154. A data file 152 needed to process the mainframe job 122 may be required to have certain file attributes 154 including, but are not limited to, a pre-defined file size, a pre-defined file format (e.g., fixed format, variable format, flat file, index-based file etc.), pre-defined headers, pre-defined trailers and a pre-defined date or date range.

Before processing a mainframe job 122, the jobs manager 120 may be configured to check the metadata 150 related to the mainframe job 122 and identify the resources (e.g., data files 152, file attributes 154 and database tables 156) needed to process the mainframe job 122. Once the required resources are identified from the metadata 150 associated with the mainframe job 122, jobs manager 120 may check whether the identified resources (e.g., data files 152, database tables 156, file attributes 154) are available. For example, jobs manager 120 may determine whether one or more required data files 152 and/or one or more required database tables 156 to be used during the processing of the mainframe job 122 are available. Additionally, jobs manager 120 may check for the integrity of the required data files 152 by determining whether one or more of the required data files 152 include or are associated with the identified file attributes 154. For example, jobs manager 120 may check whether a data file 152 includes a pre-defined header and/or a pre-defined trailer.

Upon determining that all resources needed to process the mainframe job 122 are available, jobs manager 120 initiates processing of the mainframe job 122 (e.g., submits the mainframe job 122 to a mainframe jobs scheduler).

On the other hand, upon detecting that one or more resources needed to process the mainframe job 122 are unavailable, method 200 proceeds to operation 208 where jobs manager 120 places processing of the mainframe job 122 on hold. As described above, upon detecting that one or more of the resources required to process the mainframe job 122 are unavailable, jobs manager 120 may place the processing of the mainframe job 122 on hold until the missing resources become available.

At operation 210, jobs manager 120 monitors availability of the one or more resources determined as unavailable.

At operation 212, jobs manager 120 checks whether the one or more unavailable resources are available. If one or more resources are still unavailable, jobs manager 120 continues monitoring for the unavailable resources at operation 210.

Upon detecting that the one or more unavailable resources are available, method 200 proceeds to operation 214, where jobs manager 120 processes the primary mainframe job.

As described above, after placing the mainframe job 122 on hold, jobs manager 120 may be configured to monitor availability of the missing resources. Once the requisite resources become available, jobs manager 120 may initiate processing of the mainframe job 122. In one embodiment, jobs manager 120 may initiate processing of the mainframe job 122 by loading the mainframe job 122 in a mainframe job scheduler.

In some embodiments, after placing the mainframe job 122 on hold, the jobs manager 120, instead of waiting for the missing resource to become available, generates the missing resource or a similar resource and processes the mainframe job 122 based on the generated resource. For example, when the mainframe job 122 is put on hold as a result of an unavailable data file 152, the jobs manager 120 may generate an empty data file and continue processing of the mainframe job 122 based on the generated empty file.

Figure 3:
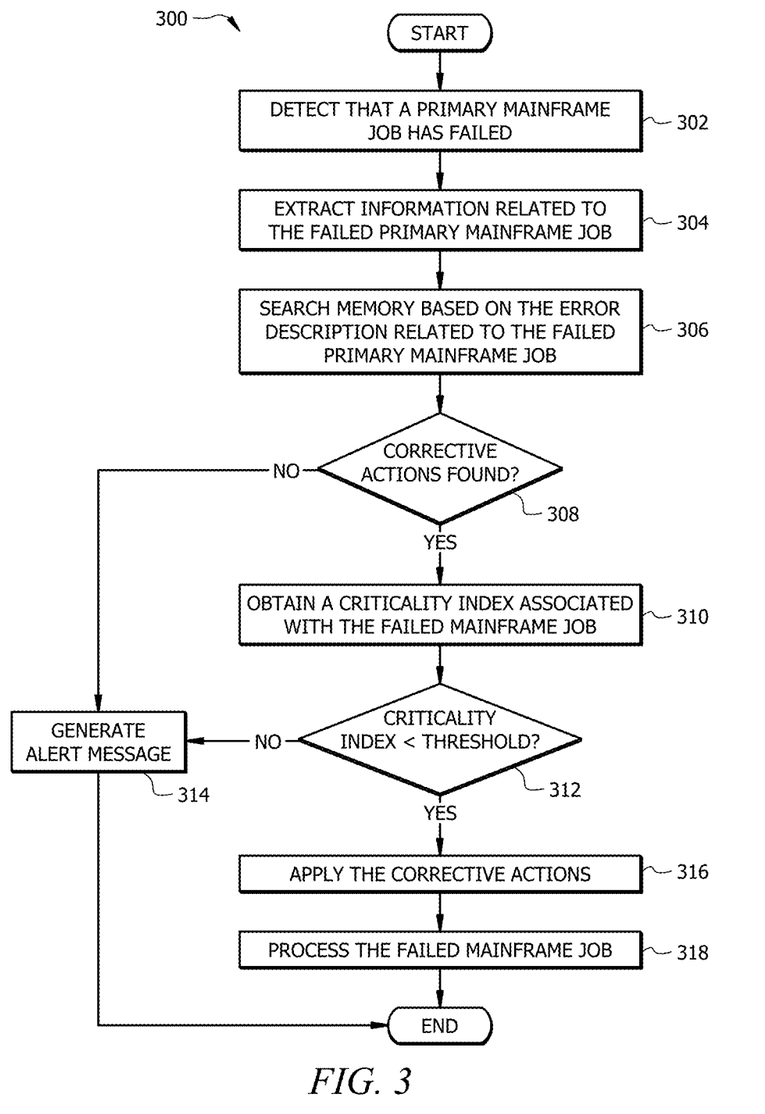
FIG. 3 is a flowchart of an example method for intelligently healing/resolving mainframe job failures, in accordance with one or more embodiments of the present disclosure.

FIG. 3 is a flowchart of an example method 300 for intelligently healing/resolving mainframe job failures, in accordance with one or more embodiments of the present disclosure. Method 300 may be performed by the jobs manager 120 as shown in FIG. 1 and described above.

At operation 302, jobs manager 120 detects that a mainframe job 122 (e.g., a primary mainframe job 124 or secondary mainframe job 126) has failed. As described above, jobs manager 120 may be configured to intelligently heal/correct failures related to mainframe jobs 122. A mainframe job 122 may fail due to several reasons or errors including, but not limited to, unavailability of required data files 152, missing file attributes 154, unavailability of required database tables 156, and inaccessible or erroneous data.

At operation 304, jobs manager 120 extracts information related to the failed mainframe job, wherein the extracted information includes an error description 162 of an error that caused the mainframe job 122 to fail.

As described above, jobs manager 120 may be configured to identify a nature of an error that caused a mainframe job 122 to fail, determine one or more corrective actions that can be taken to resolve the error, apply the one or more corrective actions to the failed mainframe job and process the mainframe job 122 after applying the one or more corrective actions. The metadata 150 relating to a failed mainframe job 122 may include an error description 162 of the error that caused the mainframe job 122 to fail. In one example, the error may be that a required data file 152 was unavailable and the corresponding error description 162 may identify this error and may further include an identity of the unavailable data file 152. In another example, the error may be that one or more file attributes 154 in relation to a data file 152 were missing and the corresponding error description 162 may identify this error and further include an identities of the data file 152 and the missing file attributes 154. In another example, the error may be that a required database table 156 was unavailable and the corresponding error description may identify this error and further include an identity of the unavailable database table 156. The error description 162 may identify an error that caused a mainframe job to fail using an error code 164. An error code 164 is unique and is generally associated with a particular known error in relation to mainframe jobs 122 and a corresponding pre-defined error definition that defines the error. Jobs manager 120 may be configured to identify the error that caused a mainframe job 122 to fail based on the error description 162 (e.g., error code 164) associated with the failed mainframe job 122.

At operation 306, jobs manager 120 searches a memory (e.g., a memory of the mainframe computer 110 and/or jobs manager 120) based on the error description 162 for a set of corrective actions 166 corresponding to the error.

As described above, metadata 150 associated with the mainframe job 122 may include a set of corrective actions 166 that may be performed to resolve an error that caused the mainframe job 122 to fail. For example, metadata 150 may store a list of error codes 164 and a set of one or more corrective actions 166 corresponding to each error code 164 in the list. Jobs manager 120 may be configured to search this list based on the error code 164 of the identified error (e.g., identified based on error description 162) that caused the mainframe job 122 to fail.

At operation 308, jobs manager 120 checks whether corrective actions 166 corresponding to the detected error were found. If corrective actions 166 were not found at operation 308, method 300 proceeds to operation 314 where an alert message 136 is generated. The alert message 136 may include the error description 162 of the error that caused the mainframe job 122 to fail. Jobs manager 120 may transmit the alert message 136 to an administrative computing node of a mainframe administrator who may take appropriate action in response to receiving the alert message 136.

If a set of corrective actions 166 were found at operation 308, method 300 proceeds to operation 310 where, in response to determining the set of corrective actions 166 based on the search, jobs manager 120 obtains a criticality index 132 associated with the failed mainframe job.

At operation 312, jobs manager 120 checks whether the criticality index 132 associated with the failed mainframe job 122 is below a criticality index threshold 134. If the criticality index 132 is below the criticality index threshold 134, method 300 proceeds to operation 316 where jobs manager 120 applies the set of corrective actions 166 in relation to the failed mainframe job.

At operation 314, jobs manager processes the failed mainframe job after applying the set of corrective actions 166.

As described above, when the error code 164 extracted from the error description 162 of the failed mainframe job 122 matches with an error code from the list, jobs manager 120 may read from the list the set of corrective actions 166 corresponding to the matched error code 164. Jobs manager 120 may apply the determined set of corrective actions 166 and re-process the mainframe job 122 after applying the corrective actions 166. In one example, when the mainframe job 122 failed as a result of an unavailable data file 152, the corresponding set of corrective actions 166 may include creating an empty file before re-processing the mainframe job 122. In another example, when the mainframe job 122 failed as a result of an invalid data field, the corresponding set of corrective actions 166 may include checking metadata 150 to determine the correct data field, correcting the data field accordingly and re-processing the mainframe job 122. In another example, when the mainframe job 122 failed as a result of unavailability of a database table 156, the corresponding set of corrective actions 166 may include checking whether the database table 156 is available, and re-processing the mainframe job 122 after confirming that the database table 156 is available.

As described above, jobs manager 120 may be configured to apply corrective actions 166 in relation to non-critical or less critical failed mainframe job 122. When jobs manager 120 identifies a set of corrective actions (as described above) in relation to an error that caused a mainframe job 122 to fail, jobs manager 120 may obtain the criticality index 132 related to the failed mainframe job 122. When the criticality index 132 is below a criticality index threshold 134, indicating that the mainframe job 122 is not critical or less critical, jobs manager 120 may proceed to apply the determined corrective actions 166 and re-process the failed mainframe job 122 after applying the corrective actions 166.

When the criticality index 132 associated with the failed mainframe job is found (at operation 312) not to be below the criticality index threshold 134, method 300 proceeds to operation 314 where jobs manager 120 generates an alert message 136.

As described above, when the criticality index 132 equals or exceeds the criticality index threshold 134, jobs manager 120 does not apply the corrective actions 166. Instead, in one embodiment, when the criticality index 132 equals or exceeds the criticality index threshold 134, jobs manager 120 generates an alert message 136 that includes the error description 162 relating to the failed mainframe job 122 and the determined set of corrective actions 166. Jobs manager 120 may be configured to transmit the alert message 136 to an administrative computing node of a mainframe administrator who may take appropriate action in response to receiving the alert message 136.

Figure 4:
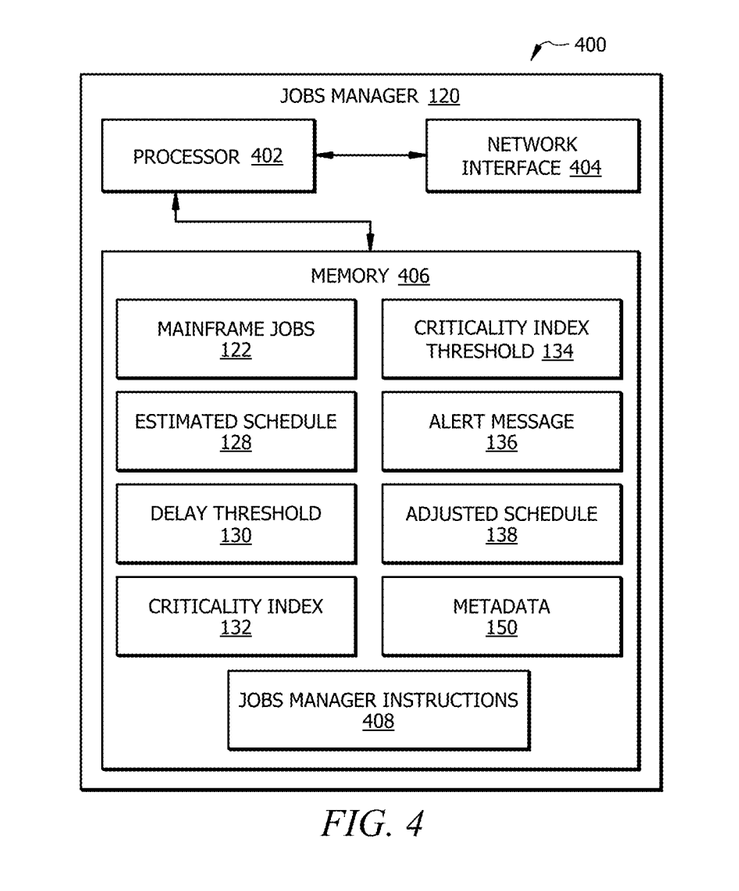
FIG. 4 illustrates an example schematic diagram of the jobs manager illustrated in FIG. 1, in accordance with one or more embodiments of the present disclosure.

FIG. 4 illustrates an example schematic diagram 400 of the jobs manager 120 illustrated in FIG. 1, in accordance with one or more embodiments of the present disclosure.

Jobs manager 120 includes a processor 402, a memory 406, and a network interface 404. The jobs manager 120 may be configured as shown in FIG. 4 or in any other suitable configuration.

The processor 402 comprises one or more processors operably coupled to the memory 406. The processor 402 is any electronic circuitry including, but not limited to, state machines, one or more central processing unit (CPU) chips, logic units, cores (e.g. a multi-core processor), field-programmable gate array (FPGAs), application specific integrated circuits (ASICs), or digital signal processors (DSPs). The processor 402 may be a programmable logic device, a microcontroller, a microprocessor, or any suitable combination of the preceding. The processor 402 is communicatively coupled to and in signal communication with the memory 406. The one or more processors are configured to process data and may be implemented in hardware or software. For example, the processor 402 may be 8-bit, 16-bit, 32-bit, 64-bit or of any other suitable architecture. The processor 402 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components.

The one or more processors are configured to implement various instructions. For example, the one or more processors are configured to execute instructions (e.g., jobs manager instructions 408) to implement the jobs manager 120. In this way, processor 402 may be a special-purpose computer designed to implement the functions disclosed herein. In one or more embodiments, the jobs manager 120 is implemented using logic units, FPGAs, ASICs, DSPs, or any other suitable hardware. The jobs manager 120 is configured to operate as described with reference to FIGS. 1-3. For example, the processor 402 may be configured to perform at least a portion of the method 200 as described in FIG. 2 and/or method 300 as described in FIG. 3.

The memory 406 comprises one or more disks, tape drives, or solid-state drives, and may be used as an over-flow data storage device, to store programs when such programs are selected for execution, and to store instructions and data that are read during program execution. The memory 406 may be volatile or non-volatile and may comprise a read-only memory (ROM), random-access memory (RAM), ternary content-addressable memory (TCAM), dynamic random-access memory (DRAM), and static random-access memory (SRAM).

The memory 406 is operable to store the mainframe jobs 122, estimated schedule 128, delay threshold 130, criticality index 132, criticality index threshold 134, alert message 136, adjusted schedule 138, metadata 150 and the jobs manager instructions 408. The jobs manager instructions 408 may include any suitable set of instructions, logic, rules, or code operable to execute the jobs manager 120.

The network interface 404 is configured to enable wired and/or wireless communications. The network interface 404 is configured to communicate data between the jobs manager 120 and other devices, systems, or domains (e.g. user devices 190, web servers 196 etc.). For example, the network interface 404 may comprise a Wi-Fi interface, a LAN interface, a WAN interface, a modem, a switch, or a router. The processor 402 is configured to send and receive data using the network interface 404. The network interface 404 may be configured to use any suitable type of communication protocol as would be appreciated by one of ordinary skill in the art.

It may be noted that each of the web servers 196 and user devices 190 may be implemented similar to the jobs manager 120. For example, each of the web servers 196 and user devices 190 may include a processor and a memory storing instructions to implement the respective functionality when executed by the processor.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

The invention claimed is:

1. A system comprising:
a memory configured to store information related to mainframe jobs; and
a processor coupled to the memory and configured to:
receive a request to process a primary mainframe job;
extract the information related to the primary mainframe job from metadata associated to the primary mainframe job, wherein the extracted information includes one or more of data files, file attributes and database tables needed to process the primary mainframe job;
detect that one or more of the files, the file attributes and the database tables is unavailable;
in response to the detecting, place the primary mainframe job on hold;
after placing the primary mainframe job on hold, monitor availability of the one or more unavailable files, file attributes or database tables;
detect that the one or more unavailable files, file attributes or database tables is available; and
in response to detecting that the one or more files, file attributes or database tables is available, process the primary mainframe job,
wherein the processor is further configured to determine a criticality index relating to the primary mainframe job based on one or more secondary mainframe jobs that are dependent on the primary mainframe job, wherein the criticality index of the primary mainframe job is higher when more secondary mainframe jobs depend on the primary mainframe job.

2. The system of claim 1, wherein the processor is configured to extract the information related to the primary mainframe job by:
obtaining the metadata related to the primary mainframe job, wherein the metadata is written in a mainframe language;
extracting a portion of the metadata that is needed to process the primary mainframe job, wherein the extracted portion of the metadata includes the extracted information; and
converting the extracted portion of the metadata into pseudo code.

3. The system of claim 1, wherein:
the extracted information includes information relating to the one or more secondary mainframe jobs that are dependent on the primary mainframe job, wherein the secondary mainframe jobs cannot be processed before completing processing of the primary mainframe job;
the extracted information includes an expected schedule relating to the primary mainframe job and the secondary mainframe jobs, wherein the expected schedule relating to a mainframe job includes an expected commencement time and an expected completion time of the mainframe job; and
the processor is further configured to:
determine an actual completion time of the primary mainframe job;
determine a delay in completion of the primary mainframe job by comparing the actual completion time of the primary mainframe job with the expected completion time of the primary mainframe job; and
determine a delayed completion time of the one or more secondary mainframe jobs based on the expected schedule of the one or more secondary mainframe jobs and the determined delay in completion of the primary mainframe job.

4. The system of claim 3, wherein the processor is further configured to:
determine a second criticality index relating to the primary mainframe job based on the delay in completion of the primary mainframe job, wherein the second criticality index of the primary mainframe job is higher when the delay is higher.

5. The system of claim 3, wherein the processor is further configured to:
determine a second criticality index relating to the primary mainframe job based on the delayed completion time of the one or more secondary mainframe jobs, wherein the second criticality index of the primary mainframe job is higher when more secondary mainframe jobs are delayed.

6. The system of claim 3, wherein the processor is further configured to:
determine that the completion time of one of the secondary mainframe jobs is delayed;
determine the delay in the completion time based on the expected completion time of the secondary mainframe job and the delayed completion time of the secondary mainframe job;
compare the delay with a delay threshold; and
when the delay equals or exceeds the delay threshold, generate an alert message.

7. The system of claim 3, wherein the processor is further configured to:
determine that the completion time of one of the secondary mainframe jobs is delayed;
determine the delay in the completion time based on the expected completion time of the secondary mainframe job and the delayed completion time of the secondary mainframe job;
determine that the delay equals or exceeds the delay threshold;
obtain a second criticality index relating to the secondary mainframe job; and
when the second criticality index equals or exceeds a criticality index threshold, generate an alert message.

8. The system of claim 3, wherein the at least one processor is further configured to:
adjust the expected schedule of the one or more secondary mainframe jobs based on the determined delayed completion times of the one or more secondary mainframe jobs, wherein the adjusted expected schedule is to be used when processing subsequent requests to process the one or more secondary mainframe jobs.

9. A method for processing mainframe jobs, comprising:
receiving a request to process a primary mainframe job;
extracting information related to the primary mainframe job from metadata associated to the primary mainframe job, wherein the extracted information includes one or more of data files, file attributes and database tables needed to process the primary mainframe job;
detecting that one or more of the files, the file attributes and the database tables is unavailable;
in response to the detecting, placing the primary mainframe job on hold;
after placing the primary mainframe job on hold, monitoring availability of the one or more unavailable files, file attributes or database tables;
detecting that the one or more unavailable files, file attributes or database tables is available; and
in response to detecting that the one or more files, file attributes or database tables is available, processing the primary mainframe job,
further comprising determining a criticality index relating to the primary mainframe job based on one or more secondary mainframe jobs that are dependent on the primary mainframe job, wherein the criticality index of the primary mainframe job is higher when more secondary mainframe jobs depend on the primary mainframe job.

10. The method of claim 9, wherein extracting the information related to the primary mainframe job comprises:
obtaining the metadata related to the primary mainframe job, wherein the metadata is written in a mainframe language;
extracting a portion of the metadata that is needed to process the primary mainframe job, wherein the extracted portion of the metadata includes the extracted information; and
converting the extracted portion of the metadata into pseudo code.

11. The method of claim 9, wherein:
the extracted information includes information relating to the one or more secondary mainframe jobs that are dependent on the primary mainframe job, wherein the secondary mainframe jobs cannot be processed before completing processing of the primary mainframe job;
the extracted information includes an expected schedule relating to the primary mainframe job and the secondary mainframe jobs, wherein the expected schedule relating to a mainframe job includes an expected commencement time and an expected completion time of the mainframe job; and
further comprising:
determining an actual completion time of the primary mainframe job;
determining a delay in completion of the primary mainframe job by comparing the actual completion time of the primary mainframe job with the expected completion time of the primary mainframe job; and
determining a delayed completion time of the one or more secondary mainframe jobs based on the expected schedule of the one or more secondary mainframe jobs and the determined delay in completion of the primary mainframe job.

12. The method of claim 11, further comprising:
determining a second criticality index relating to the primary mainframe job based on the delay in completion of the primary mainframe job, wherein the second criticality index of the primary mainframe job is higher when the delay is higher.

13. The method of claim 11, further comprising:
determining a second criticality index relating to the primary mainframe job based on the delayed completion time of the one or more secondary mainframe jobs, wherein the second criticality index of the primary mainframe job is higher when more secondary mainframe jobs are delayed.

14. The method of claim 11, further comprising:
determining that the completion time of one of the secondary mainframe jobs is delayed;
determining the delay in the completion time based on the expected completion time of the secondary mainframe job and the delayed completion time of the secondary mainframe job;
comparing the delay with a delay threshold; and
when the delay equals or exceeds the delay threshold, generating an alert message.

15. The method of claim 11, further comprising:
determining that the completion time of one of the secondary mainframe jobs is delayed;
determining the delay in the completion time based on the expected completion time of the secondary mainframe job and the delayed completion time of the secondary mainframe job;
determining that the delay equals or exceeds the delay threshold;
obtaining a second criticality index relating to the secondary mainframe job; and
when the second criticality index equals or exceeds a criticality index threshold, generating an alert message.

16. The method of claim 11, further comprising:
adjusting the expected schedule of the one or more secondary mainframe jobs based on the determined delayed completion times of the one or more secondary mainframe jobs, wherein the adjusted expected schedule is to be used when processing subsequent requests to process the one or more secondary mainframe jobs.

17. A non-transitory computer-readable medium storing instructions that when executed by a processor cause the processor to:
receive a request to process a primary mainframe job;
extract information related to the primary mainframe job from metadata associated to the primary mainframe job, wherein the extracted information includes one or more of data files, file attributes and database tables needed to process the primary mainframe job;
detect that one or more of the files, the file attributes and the database tables is unavailable;
in response to the detecting, place the primary mainframe job on hold;
after placing the primary mainframe job on hold, monitor availability of the one or more unavailable files, file attributes or database tables;
detect that the one or more unavailable files, file attributes or database tables is available; and
in response to detecting that the one or more files, file attributes or database tables is available, process the primary mainframe job,
wherein the instructions further cause the processor to determine a criticality index relating to the primary mainframe job based on one or more secondary mainframe jobs that are dependent on the primary mainframe job, wherein the criticality index of the primary mainframe job is higher when more secondary mainframe jobs depend on the primary mainframe job.

18. The non-transitory computer-readable medium of claim 17, wherein:
the extracted information includes information relating to the one or more secondary mainframe jobs that are dependent on the primary mainframe job, wherein the secondary mainframe jobs cannot be processed before completing processing of the primary mainframe job;

the extracted information includes an expected schedule relating to the primary mainframe job and the secondary mainframe jobs, wherein the expected schedule relating to a mainframe job includes an expected commencement time and an expected completion time of the mainframe job; and wherein the instructions further cause the processor to:
  determine an actual completion time of the primary mainframe job;
  determine a delay in completion of the primary mainframe job by comparing the actual completion time of the primary mainframe job with the expected completion time of the primary mainframe job; and
  determine a delayed completion time of the one or more secondary mainframe jobs based on the schedule of the one or more secondary mainframe jobs and the determined delay in completion of the primary mainframe job.

* * * * *